J. W. BUTCHER, Jr.
TRUCK HANDLE CLAMP.
APPLICATION FILED JULY 22, 1910.
1,020,961.
Patented Mar. 26, 1912.
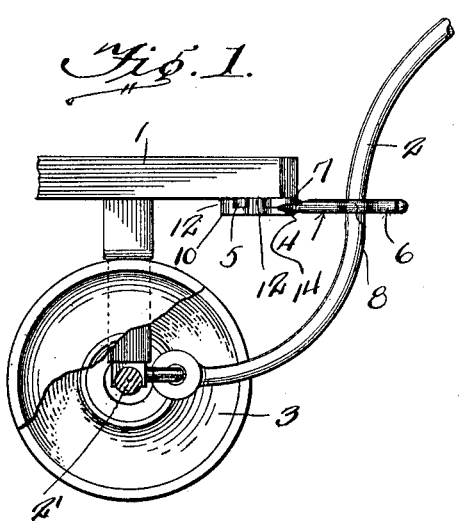
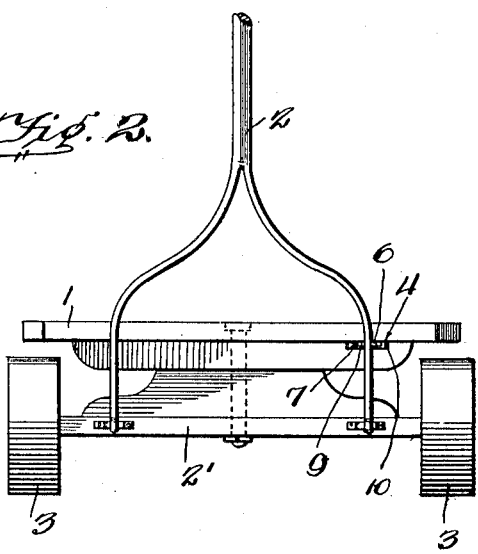
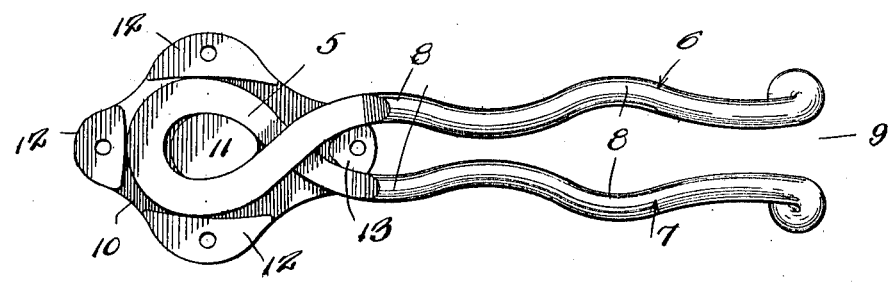
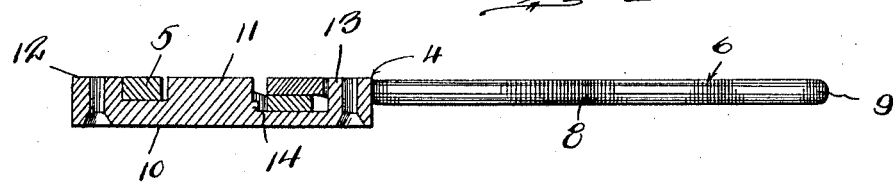
Witnesses
Frederick L. Fox.
Irving J. King
Inventor
James W. Butcher, Jr.
By Victor J. Evans
Attorney
COLUMBIA PLANOGRAPH CO., WASHINGTON, D. C.

UNITED STATES PATENT OFFICE.

JAMES W. BUTCHER, JR., OF WASHINGTON, DISTRICT OF COLUMBIA.

TRUCK-HANDLE CLAMP.

1,020,961. Specification of Letters Patent. Patented Mar. 26, 1912.

Application filed July 22, 1910. Serial No. 573,334.

*To all whom it may concern:*

Be it known that I, JAMES W. BUTCHER, Jr., a citizen of the United States, residing at Washington, in the District of Columbia, have invented new and useful Improvements in Truck-Handle Clamps, of which the following is a specification.

This invention relates to trucks, and primarily to means for retaining the handle of a truck in an upright position when the said truck is not in use, the object of the invention being to provide a device of this character which may be easily and quickly attached to the truck and which will effectively sustain the handle in an upright position when the truck is not being used.

With the above, and other objects in view, which will appear as the description progresses, the invention resides in the novel construction and combination of parts hereinafter fully described and claimed.

In the accompanying drawings there has been illustrated a simple and preferred embodiment of the improvement, and in which drawings, Figure 1 is a side elevation of a truck showing the improved device attached thereto. Fig. 2 is a front elevation of the same. Fig. 3 is a top plan view of the improved clamp taken upon an enlarged scale. Fig. 4 is a central longitudinal sectional view of the same.

It is a well known fact that the handles of trucks employed in storage rooms or the like offer dangerous obstacles to persons passing through the warehouse, as in the ordinary construction of trucks the handle is allowed to lie upon the ground when the truck is not in use, and the extending handle lying at an angle from the truck to its rest upon the ground is hardly perceptible in darkened places and offers a menace to the persons passing through the warehouse.

It is the primary object of the present invention to provide a simple and effective means for retaining the handle of the truck in an upright position whereby danger of the same being accidentally thrown or moved is effectively obviated.

In the drawings the numeral 1 designates the truck, and 2 the handle for the truck. This truck 1 is provided with the usual axle 2' having its ends provided with wheels 3. The handle 2, is, of course, attached to the axle in the usual manner.

The numeral 4 designates the improved handle clamp. The clamp 4 is adapted to project a suitable distance beyond the face or front of the truck, as clearly illustrated in Figs. 1 and 2 of the drawings and the said clamp has its body portion constructed of a single piece of resilient material. The clamp 4 comprises a flattened loop or body portion 5 which is integrally formed with spaced longitudinally extending arms 6 and 7. The arms 6 and 7 are bent one above the other at the point of communication with the loop 5, and the said arms are provided with inwardly inclined portions terminating in outturned or bulging portions 8 and are thence continued in substantially parallel relation with each other and have their extremities rounded to provide a flaring mouth 9. It is to be understood that the arms 6 and 7 are adapted to exert pressure toward each other, the same being constructed of suitable resilient material and it will be further noted that when the handle is thrust through the flaring mouth 9 the same will be received within the bulging portions 8 which may be termed the pocket of the device.

In order to effectively secure the clamp upon the truck I provide a housing 10. This housing 10 is centrally provided with a projection 11, of a contour corresponding with the inner face of the loop of the clamp, and positioned at spaced intervals adjacent the central projection are the lugs 12, each of which being provided with an opening adapted for the reception of a threaded element whereby the housing may be effectively retained upon the truck. The space between the projection 11 and the lugs 12 equals the width of the loop of the clamp, and one of the said legs designated by the numeral 13 has its inner face of a substantially V-shaped formation so as to normally contact the arms upon their inner edges and at their points of diverging from the loop. In order to allow the loop of the clamp to lie snugly with its face in a horizontal plane to that of the housing the wall of the housing adjacent the lug 13 is curved downwardly as at 14 so as to compensate for the thickness of the arms at their point of connection with the flattened loop.

From the above description, taken in connection with the accompanying drawings, it will be noted that I have provided an extremely simple and effective device for the purpose intended, and while I have illustrated and described the preferred embodiment of the improvement, as it now appears to me, minor details of construction, within the scope of the following claims may be resorted to if desired.

Having thus fully described the invention, what I claim as new is:—

In a device for the purpose set forth, a housing said housing being provided with an open face and having two of its sides, and one of its ends provided with lugs, the opposite end of the housing being provided with a substantially V-shaped projection and the central portion of the housing being also provided with a curved projection of non-circular contour, a clamp constructed of a single strand of resilient material, said clamp comprising a looped portion having longitudinally extending arms, one overlapping the other, and having their extremities curved outwardly to provide a flaring mouth, the loop of the clamp adapted to engage the centrally curved projection of the said housing whereby with the coöperation of the lugs on the two sides, and one end of the housing a means is provided to securely hold the clamp within the housing and the V-shaped projection of the said housing adapted to be contacted by the opposite arms to retain the said arms in spaced relation with each other.

In testimony whereof I affix my signature in presence of two witnesses.

JAMES W. BUTCHER, Jr.

Witnesses:
C. E. JONES,
RICHARD T. JONES.

---

Copies of this patent may be obtained for five cents each, by addressing the "Commissioner of Patents, Washington, D. C."